United States Patent
Pagani (10) Patent No.: US 9,778,117 B2
(45) Date of Patent: Oct. 3, 2017

(54) INTEGRATED ELECTRONIC DEVICE FOR MONITORING PRESSURE WITHIN A SOLID STRUCTURE

(71) Applicant: STMICROELECTRONICS S.R.L., Agrate Brianza (IT)

(72) Inventor: Alberto Pagani, Nova Milanese (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 17 days.

(21) Appl. No.: 14/780,819

(22) PCT Filed: Mar. 27, 2014

(86) PCT No.: PCT/IB2014/060203
§ 371 (c)(1),
(2) Date: Sep. 28, 2015

(87) PCT Pub. No.: WO2014/155326
PCT Pub. Date: Oct. 2, 2014

(65) Prior Publication Data
US 2016/0041046 A1    Feb. 11, 2016

(30) Foreign Application Priority Data

Mar. 29, 2013 (IT) .............. MI2013A0482

(51) Int. Cl.
*G01L 1/14* (2006.01)
*G01L 25/00* (2006.01)
*G01L 1/26* (2006.01)

(52) U.S. Cl.
CPC .............. *G01L 1/142* (2013.01); *G01L 1/144* (2013.01); *G01L 1/148* (2013.01); *G01L 1/26* (2013.01); *G01L 25/00* (2013.01)

(58) Field of Classification Search
CPC ......... H01L 29/84; H01L 21/66; H01L 21/50; G01L 1/14; G01L 1/142; G01L 1/144; G01L 1/148; G01L 1/26; G01L 25/00
(Continued)

(56) References Cited

U.S. PATENT DOCUMENTS 6,201,467 B1    3/2001  Winterer et al.
6,228,662 B1 *  5/2001  Hayashi .................. H01L 31/18
                                                    136/243
(Continued)

FOREIGN PATENT DOCUMENTS

CN          1249034         3/2000
CN          1896748         1/2007
(Continued)

OTHER PUBLICATIONS

Barlian et al.—Semiconductor Piezoresistance for Microsystems, Proceedings of the IEEE, Mar. 2009, pp. 513-552, vol. 97, No. 3., USA.
(Continued)

*Primary Examiner* — Lisa Caputo
*Assistant Examiner* — Octavia Hollington
(74) *Attorney, Agent, or Firm* — Slater Matsil, LLP (57) ABSTRACT

The integrated electronic device detects the pressure related to a force applied in a predetermined direction within a solid structure. The device includes an integrated element that is substantially orthogonal to the direction of application of the force. First and second conductive elements are configured to face an operating surface. A measure module includes first and second measurement terminals which are electrically connected to the first and second conductive elements, respectively. A detecting element is arranged in the predetermined direction such that the operating surface is sandwiched between the first and second conductive elements
(Continued)

and this detecting element. An insulating layer galvanically insulates the first and second conductive elements. A layer of dielectric material is sandwiched between the detecting element and the insulating layer, and is elastically deformable following the application of the force to change an electromagnetic coupling between the detecting element and the first and second conductive elements.

37 Claims, 9 Drawing Sheets

(58) Field of Classification Search
USPC .................................................... 73/862.626
See application file for complete search history.

(56) References Cited

U.S. PATENT DOCUMENTS

| | | | |
|---|---|---|---|
| 6,636,053 B1* | 10/2003 | Gozzini | G01D 5/24 |
| | | | 324/658 |
| 6,686,546 B2* | 2/2004 | Chiu | G06K 9/00053 |
| | | | 178/18.01 |
| 6,950,767 B2 | 9/2005 | Yamashita et al. | |
| 7,119,552 B2* | 10/2006 | Morimoto | G01L 1/144 |
| | | | 324/661 |
| 8,592,944 B2* | 11/2013 | Santangelo | H01L 23/48 |
| | | | 257/528 |
| 8,978,483 B2* | 3/2015 | Pagani | G01M 5/0041 |
| | | | 73/862 |
| 9,464,952 B2* | 10/2016 | Pagani | G01L 1/18 |
| 2009/0033467 A1 | 2/2009 | Finocchiaro et al. | |
| 2012/0222498 A1 | 9/2012 | Mamigonians | |
| 2013/0001550 A1* | 1/2013 | Seeger | G01L 5/223 |
| | | | 257/48 |

FOREIGN PATENT DOCUMENTS

| | | |
|---|---|---|
| CN | 103528915 | 1/2014 |
| EP | 1589327 A1 | 10/2005 |
| GB | 2488600 A | 9/2012 |
| WO | 2007036922 A1 | 4/2007 |
| WO | 2013003789 A1 | 1/2013 |

OTHER PUBLICATIONS

Suhling et al.—Silicon Piezoresistive Stress Sensors and Their Application in Electronic Packaging, IEEE Sensors Journal, Jun. 2001, pp. 14-29., vol. 1, No. 1., USA.

Jaeger et al.—CMOS Stress Sensors on (100) Silicon, IEEE Journal of Solid-State Circuits, Jan. 2000, pp. 85-95., vol. 35, No. 1., USA.

Huttunen et al.—Capacitive Sensor Arrangement to Detect External Load on a Mobile Terminal Antenna, Progress in Electromagnetics Research Letters, Electromagnetics Academy, Jan. 1, 2010, pp. 13-18, vol. 15, USA.

Physik Instrumente—Capacitive Displacement Sensors—Nanometrology Solutions, available at https://web.archive.org/web/20120504130810/http:jjwww.capacitance-sensors .com/pdf/Cap_Sens_Web_PI_Capacitive_Displacement_Nanometrology_Capacitance Gauge Sensor E.pdf., May 4, 2012, 16 pp., USA.

* cited by examiner

FIG. 21

INTEGRATED ELECTRONIC DEVICE FOR MONITORING PRESSURE WITHIN A SOLID STRUCTURE

TECHNICAL FIELD

The present invention relates to integrated electronic devices for detecting a locally perceived pressure, within a solid structure, in a specific direction. The present invention also relates to a detecting and monitoring module which uses the above-mentioned device and a respective pressure monitoring system within a solid structure.

BACKGROUND

In solid structures, in particular in load-bearing structures of, for example, bridges, buildings, galleries, railways, retaining walls, dams, dykes, slabs and beams of buildings, underground piping and structures of urban subways, and the like, it may be important to monitor, in several points, significant parameters, particularly mechanical stresses (and thus those forces and/or pressures causing the latter) to which the structure is subjected in those locations. In the present description, solid structures are considered such as structures made from construction material, for example cement, concrete, mortar.

Such monitoring, which is carried out either periodically or continuously, is useful both in the initial step and during the life of the structure. To this purpose, electronic monitoring devices are known to be used which are based on electronic sensors capable or providing a good performance while being cost-effective. Usually, these devices are either applied to the surface of the structures to be monitored or within recesses previously provided within the structure and that can be accessed from the outside thereof.

To enhance the performance of the monitoring, in view of evaluating the quality of the structure, the safety, the aging, the reaction to varying atmospheric conditions thereof, and the like, approaches have been also carried out which provide monitoring electronic devices that are "buried" into the material (for example reinforced concrete) of which the structure to be monitored is made. Among them, the device described in the U.S. Pat. No. 6,950,767 is a whole system packaged in one container, which includes several parts that are assembled on a substrate, such as integrated circuits, sensors, antennas, capacitors, batteries, memories, and control units, which are implemented in various "chips" that are connected to each other via metal connections.

As a whole, U.S. Pat. No. 6,950,767 describes an approach of the "System in Package" type (SiP). It should be understood, however, that a SiP, which is first "drowned" in a construction material (e.g. liquid concrete) and intended to remain "buried" within the solid structure, is subjected to environmentally significant conditions, for example due to the very high pressures to which it is subjected, which can even be as high as 600 atmospheres. A number of other wear causes should also be added to the above, which are due for example to water leakage, which can damage the above-mentioned system over time. Therefore, in the above-mentioned field of application, a SiP such as that in U.S. Pat. No. 6,950,767, may be poorly reliable.

Other electronic devices are also known, which are suitable to detect a pressure and consequently the force or mechanical stress that has generated the latter and which are particularly carried out via capacitive pressure sensors. However, these devices cannot be used in the monitoring of the solid structures. In fact, the constructional characteristics of these devices make them vulnerable both to the above-mentioned pressures which are present within the structures and to the effects of corrosion which is caused by water leaking into the structures. Accordingly, these capacitive pressure sensors may also be poorly reliable.

SUMMARY

An object of the present invention is to provide an integrated electronic device for detecting a pressure and/or mechanical stress, within a solid structure, which overcomes the drawbacks described above with reference to the prior art.

This and other objects may be achieved with an integrated electronic device that detects the pressure related to a force applied in a predetermined direction within a solid structure. The device includes an integrated element that is substantially orthogonal to the direction of application of the force. First and second conductive elements are configured to face an operating surface. A measure module includes first and second measurement terminals which are electrically connected to the first and second conductive elements, respectively. A detecting element is arranged in the predetermined direction such that the operating surface is sandwiched between the first and second conductive elements and this detecting element. An insulating layer galvanically insulates the first and second conductive elements. A layer of dielectric material is sandwiched between the detecting element and the insulating layer, and is elastically deformable following the application of the force to change an electromagnetic coupling between the detecting element and the first and second conductive elements.

A detection and monitoring module including such a detecting device is also provided. Moreover, a monitoring system may include at least one detection and monitoring module (and accordingly an integrated electronic device) according to the invention.

BRIEF DESCRIPTION OF THE DRAWINGS

Further characteristics and advantages of the integrated electronic detecting device, according to the invention, will appear from the description below of preferred exemplary embodiments, which are given by way of non-limiting illustration, with reference to the annexed figures, in which.

DETAILED DESCRIPTION

With reference to the above-mentioned FIGS. 1-12B, an electronic device integrated on a chip of semiconductor material for detecting a pressure related to a force F or mechanical stress which pressure is experienced in a predetermined direction "d", within a solid structure, according to the present invention and in the several embodiments is designated with numerals 400, 400a, 500, 500', 600, 600', 700, 700'. For simplicity, the above-mentioned electronic device will be designated herein below as the "detecting device" or simply device. Furthermore, equal or similar elements and components will be designated with the same numerals throughout the figures listed above.

Figure 1:
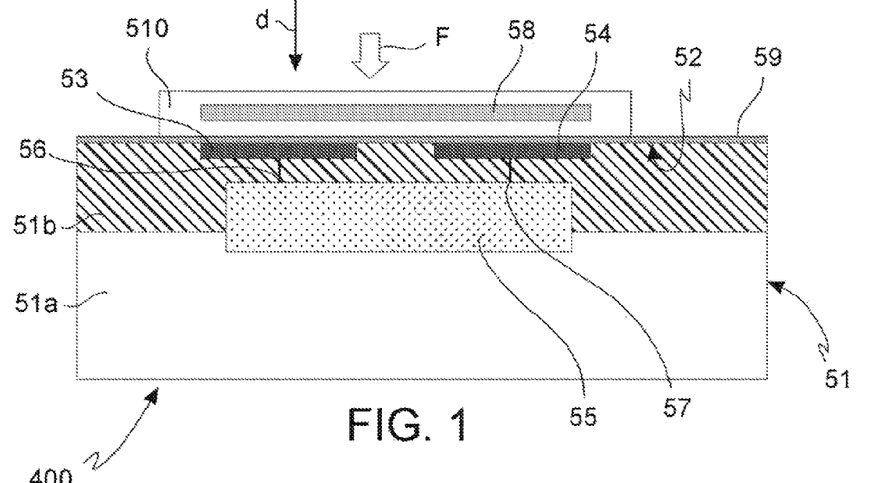
FIG. 1 is cross-sectional view of a preferred embodiment of the device according to the invention.
Figure 2:
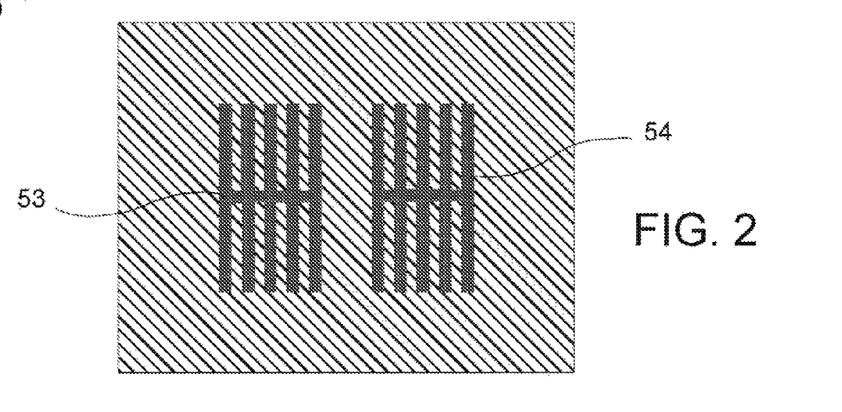
FIG. 2 is a top-sectional view (relative to a horizontal plane passing through the sensor) of the device in FIG. 1.

With reference to FIG. 1, the detecting device 400 or pressure sensor comprises an integrated element 51, particularly of a semiconductor material, which is defined by an operating surface 52 of the chip which is substantially orthogonal to the direction d of application of the force F. It should be noted that the integrated element 51 is schematically represented by two overlapping layers: a first layer or substrate 51a comprising the semiconductor material, for example silicon; and a second layer 51b corresponding to the metallizations connecting the several elements of the circuits which are integrated and provided in the first layer 51a. Furthermore, the device 400 comprises first and second conductive elements designated with 53 and 54, respectively, which are accommodated within the integrated element 51, particularly in the second layer 51b, and configured to face the operating surface 52.

In an embodiment, these first and second conductive elements 53 and 54 are metallic elements. In a preferred embodiment, with reference to FIG. 2, the first and second conductive elements 53 and 54 are metal plates having an interdigitated structure to avoid the formation of eddy currents which would negatively affect the performance of the entire device in case the latter also comprises an integrated (embedded) antenna, as will be detailed below. It should be observed that the metal plates 53 and 54 can also have a geometric shape other than that illustrated in FIG. 2.

The detecting device 400 further comprises circuits, among which an electronic measure module 55 is accommodated within the integrated element 51 and comprises first and second measure terminals 56 and 57 which are electrically connected to said first and second conductive elements 53 and 54, respectively. This measure module 55 particularly comprises the integrated functional circuitry of the sensor. This functional circuitry of the module 55 is integrated within the integrated element 51, particularly within the first layer 51a, and is provided with connecting lines comprised within the second layer 51b and including several metallization levels connected by conductive vias, using known microelectronic techniques.

In addition, the detecting device 400 comprises a detecting element 58 arranged in the predetermined direction "d" such that the device operating surface 52 is sandwiched between the first and second conductive elements 53 and 54, on the one side, and the above-mentioned detecting element 58, on the other side. In an embodiment, the detecting element 58 is implemented by a conductive element made as one piece. In a preferred embodiment the conductive element 58 is made of a material resistant to corrosion and/or oxidation. This conductive element 58 can be a metal plate, for example, of aluminum. Alternatively, this conductive element 58 is manufactured using a conductive polymer or other conductive material. In an embodiment, with reference to FIG. 7, the metal plate 58 has an interdigitated structure. However, this metal plate 58 can have varying geometric shapes.

Still with reference to FIG. 1, the detecting device 400 comprises an insulating layer or a passivating layer 59 which is suitable to cover at least the operating surface 52 to galvanically insulate the first and second conductive elements 53 and 54 from the outside of the integrated element 51. As these first and second conductive elements 53 and 54 are connected beneath the passivating layer 59, they are substantially insensitive to the corrosion and/or oxidation effects carried out by external agents (for example, humidity, acidic substances) which could degrade the structure thereof and consequently affecting the reliability of the entire detecting device 400.

With reference to FIGS. 4, 5, 6, 8 and 9 the passivating layer 59 is a waterproof and protective layer which completely covers the integrated element 51 of the detecting device 400a, 500, 500', 600, 600', such that both the measure module 55 and the conductive elements 53, 54 are, as a whole, entirely tightly sealed and galvanically insulated from the surrounding environment. This passivating layer 59 can be made of, in several exemplary embodiments comprised in the invention, silicon oxide, or silicon nitride, or silicon carbide.

In addition, the device 400 comprises a layer of dielectric material 510 which is at least sandwiched between the detecting element 58 and the passivating layer 59. Particularly, the layer of dielectric material 510 is elastically deformable following the application of the force F in the predetermined direction d to change an electromagnetic coupling between the detecting element 58 and the first and second conductive elements 53 and 54. In the example in FIG. 1, the application of the force F in the direction d is suitable to substantially change, following the elastic deformation of the dielectric 510, the distance between the detecting element 58 and the first and second conductive elements 53 and 54, particularly by moving the detecting element 58 towards these conductive elements 53 and 54.

Figure 13:
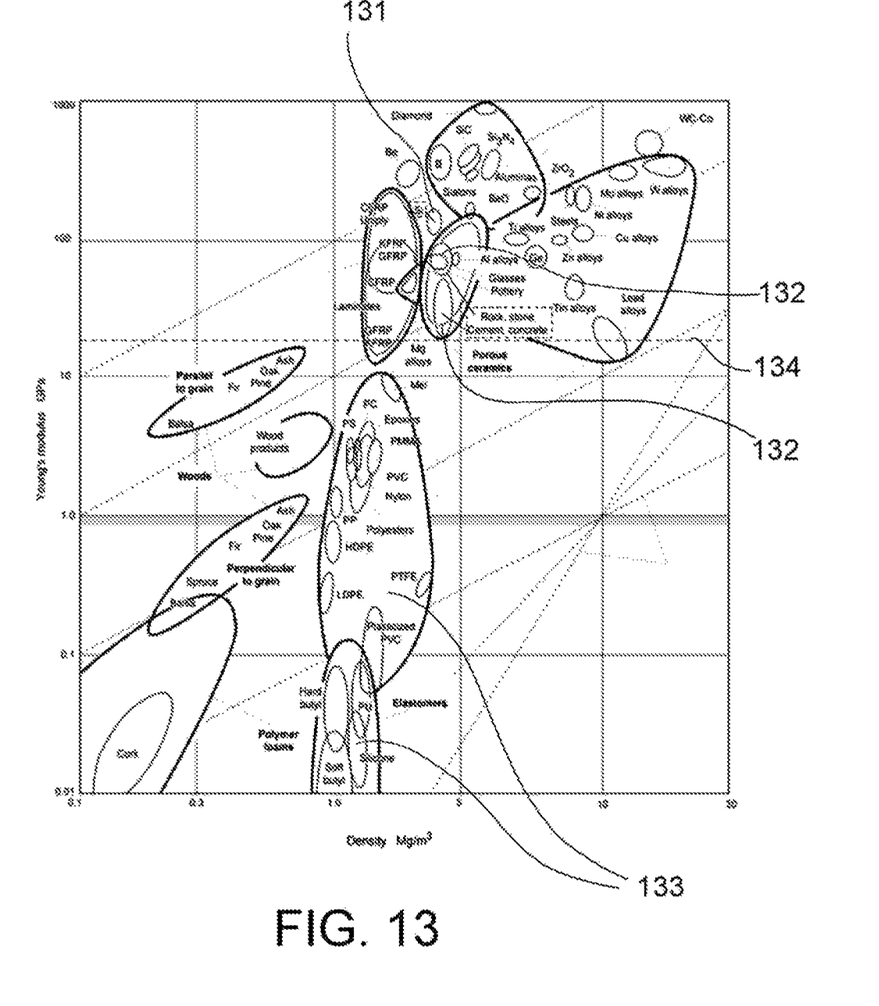
FIG. 13 is a perspective diagram of Young's modulus and density of a number of materials, where properties of interest of materials relevant to the present invention are shown.

With reference now to FIG. 13, the flexible/elastic material composing the dielectric 510 in the device 400 will be described in greater detail. The property of this material should be of deforming following the application of the force F acting thereon, as per the designation thereof as an "elastic/flexible" material in order to transfer this force F to the detecting element 58 by moving the latter from the rest position. The terms "elastic" and "flexible" are considered as synonyms. Particularly, this material should be more elastic than the construction material (for example reinforced concrete or stone) of the structure to be monitored, and, advantageously, also more elastic of the semiconductor (for example, silicon) of which the circuitry and the substrate 51a of the detecting device 400 are made.

For a more rigorous definition of "elastic/flexible", reference should be made to the general diagram in FIG. 13 (which is well-known in the technology of materials), which illustrates the modulus of elasticity or Young modulus (Y-axis) and the density of a number of materials (X-axis). The Young modulus is known to provide a measure of the stiffness, and therefore also of the flexibility/elasticity of a material. The relevant parts of FIG. 13 are those highlighted, particularly those areas in the plot that are designated with numeral 131 (Young modulus and density of the silicon), with numeral 132 (small areas related to the Young modulus and density of the concrete and of the rock, stone cement, concrete) and with the numeral 133 (Young modulus and density of polymeric and elastomeric materials, in particular suitable for use as a flexible/elastic material for the dielectric 510 of the device of the present invention).

The materials comprised in the region 133 (for example polyesters, PVC, silicone, Teflon, Kapton, Polyimide, PEN, PET, epoxy resins, elastomers, rubber, polyformaldehyde, polypropylene, PMMA, polyethylene, polycarbonate) have a lower Young modulus, even very lower, than that of silicon and the above-mentioned construction materials, and further have a density that is not too dissimilar thereto. Therefore they are suitable for use in the present invention.

Generally, it can be said that those materials having a Young modulus lower than that of silicon and construction materials of the solid structures to be monitored, therefore lower than the threshold indicated in FIG. 13 with a broken line 134 are suitable to be used for the dielectric layer 510. Preferably, those materials having a Young modulus lower to 20 Gpa are suitable to be used. More preferably, those materials having a Young modulus lower to 10 Gpa are suitable to be used for the dielectric layer 510. This layer of dielectric material 510 can be made with a polymer or elastomer such as for example: polyamide, polyimide, Teflon, kapton, epoxy resin, silicone, PVC, PTFE, polyester, nylon, PMMA, PEN, PET, rubber, resins, polyformaldehyde, polypropylene, polyethylene, polycarbonate, or composite materials.

Figure 3:
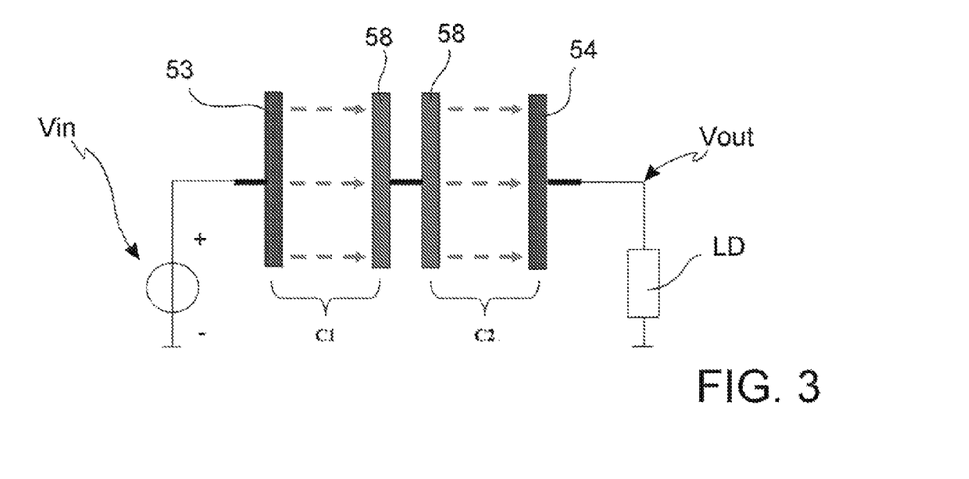
FIG. 3 is a schematic diagram illustrating an equivalent electric circuit of the device in FIG. 1 as having an input connected to a voltage generator and an output connected to a load.

With reference to FIGS. 1 and 3, it should be observed that the first conductive element 53 and the detecting element 58 form the plates of a first capacitor C1. Similarly, the second conductive element 54 and the detecting element 58 form the plates of a second capacitor C2 series-connected to the first capacitor C1. In other words, the capacitive sensor of the invention may be defined by two capacitors C1, C2 series-connected to each other.

With reference to FIG. 3, an input voltage signal Vin, for example a direct voltage or a variable voltage, generated by the measure module 55 on the first measure terminal 56, is transferred by electromagnetic coupling, from the first conductive element 53 to the detecting element 58 and, from the latter to the second conductive element 54, i.e. to the second measure terminal 57. Thereby, an output voltage signal Vout detected from the measure module circuits 55 (represented herein as an equivalent output load LD, for example a capacitive or resistive or inductive load, more generally an impedance), is the result of the variation in the partition of this input voltage Vin on the series C1, C2 and on this load LD. Assuming that the value LD is constant, the voltage Vout being detected by the measure module 55 is a function of the capacity equivalent to the series C1, C2. This equivalent capacity varies following the application of the force F, as stated above.

In a further embodiment, if the input voltage signal Vin is variable over time, the measure module 55 is configured to measure a variation in the peak voltage value, or a peak-to-peak value or an effective value of the output voltage signal Vout to determine the sensor capacity variation and determine the force F or mechanical stress applied thereto.

With reference now to FIGS. 4-6, 8-12B, several embodiments of the detecting device 400a, 500, 500', 600, 600', 700, 700' according to the invention will be described, which differ from each other in several details of the structural configuration thereof. Particularly, the detecting device 400a comprises an embedded antenna 520 provided in the second layer 51b of the integrated element 51 associated with the functional circuitry of the measure module 55. This antenna 520 is suitable to transmit the measured data, i.e. the intensity of the electrical variable representative of the physical magnitudes, force and/or pressure, to be detected and monitored to the outside of the detecting device 400a, in a wireless or contactless mode. The embedded antenna 520 is further configured to receive operating commands from the outside. Furthermore, the embedded antenna 520 is also configured to receive radiofrequency waves which are required for remotely supplying (i.e. by a "contactless power supply") the detecting device 400a, without requiring batteries or a local power supply. Similar considerations are also valid for the embedded antennas 520 of the detection devices 500, 500', 600, 600', 700, 700'.

Figure 4:
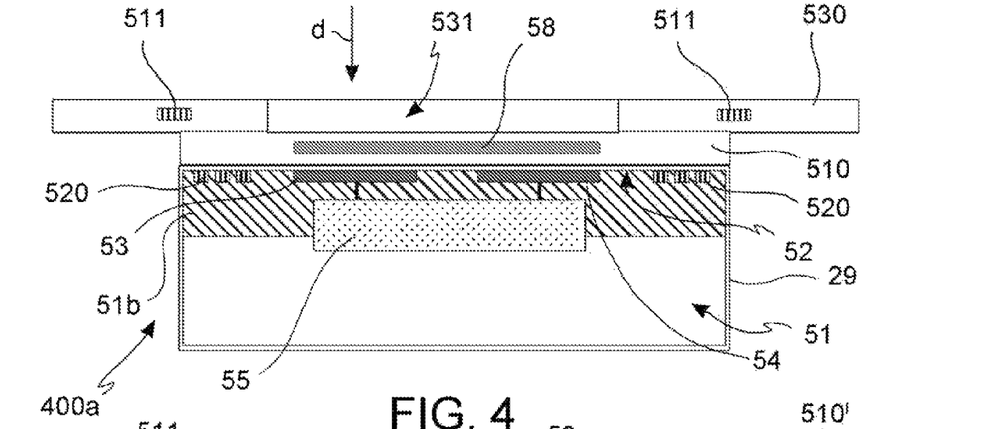
FIGS. 4, 5, 6 are cross-sectional views relating to three further embodiments of the device according to the invention, respectively.
Figure 5:
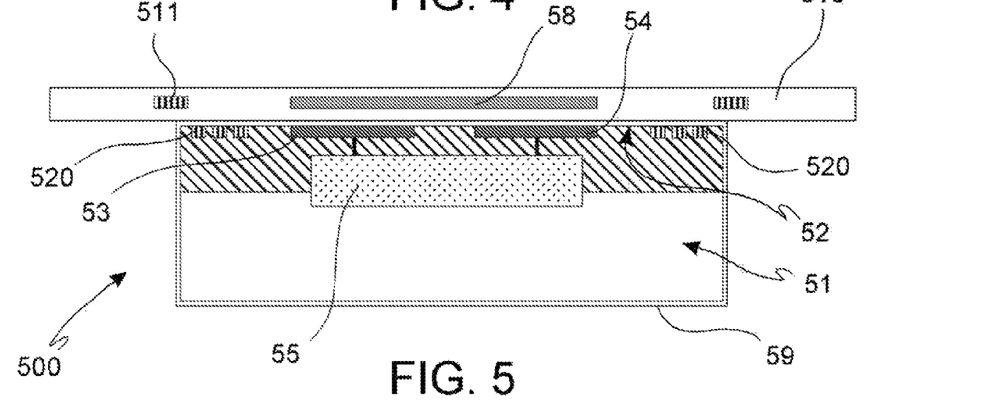

With further reference to FIG. 4, the detecting device 400a comprises an electromagnetic means or appliance 511 for transmitting/receiving electromagnetic signals and energy between the measure module 55 and a system external to the device.

Figure 7:
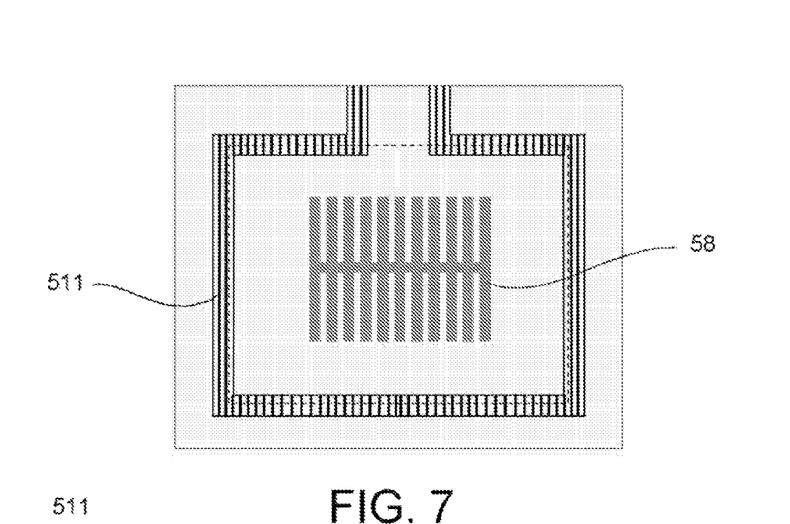
FIG. 7 is a top-sectional view (relative to a horizontal plane passing through the sensor) of the device in FIGS. 5 and 6.

Particularly, the electromagnetic appliances 511, which are shown in detail in the plan sectional view in FIG. 7, are accommodated within a support layer 530 of the device which is arranged in the predetermined direction d such that the layer of dielectric material 510 is sandwiched between the passivation layer 59 and this support layer 530. It should be observed that these electromagnetic appliances 511 are configured to be magnetically coupled with the embedded antenna 520 of the device thereby allowing for the transmission/reception of electromagnetic signals between the measure module 55 and the external environment, and obtaining the energy for operating the integrated element 51.

In an embodiment, still in relation to FIG. 4, the support layer 530 comprises a through-cavity 531 which is provided in the predetermined direction d at the detecting element 58. This allows for an improved transmission of the force F to the sensor which results in an improved reliability of the measurement.

Figure 6:
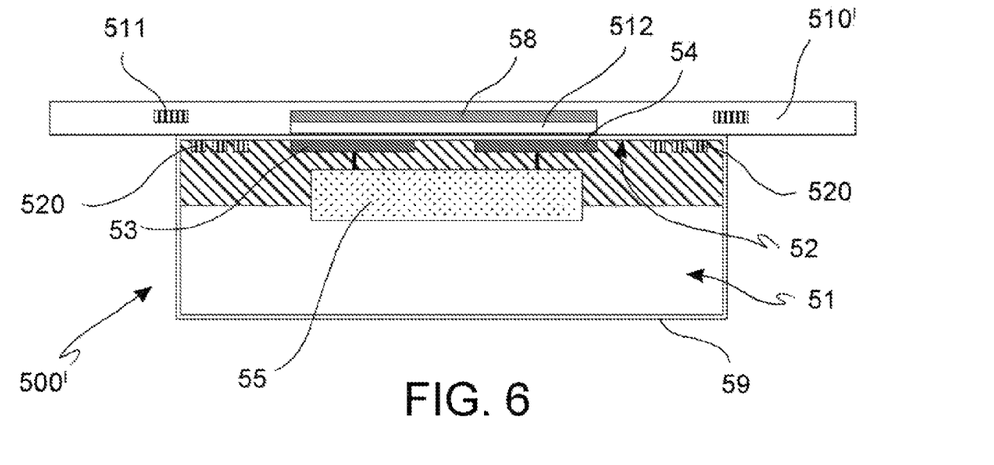

In another embodiment shown in FIGS. 5-6, 8-11 the same support layer 510' is made of an elastically deformable dielectric material and also comprises, in addition to the electromagnetic means 511, the detecting element 58 and results at least partially adjacent to the passivation layer 59 at the operating surface of the chip 52. In the embodiment of FIG. 6, the support layer 510' made of elastically deformable dielectric material includes a first dielectric layer 512 sandwiched between the detecting element 58 and the passivation layer 59. This first dielectric layer 512 has a respective dielectric constant or greater than the dielectric constant associated with the support layer made of a deformable dielectric material 510'.

Figure 8:
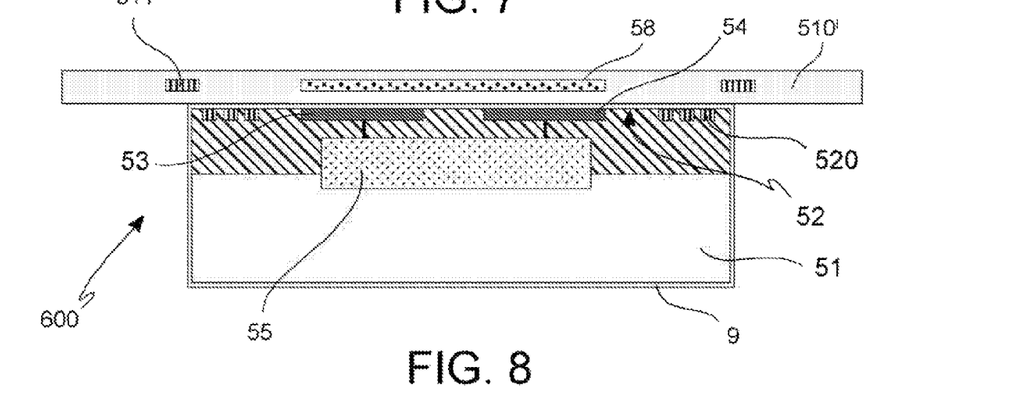
FIGS. 8, 9 are cross-sectional views which relate to further embodiments of the device according to the invention.
Figure 9:
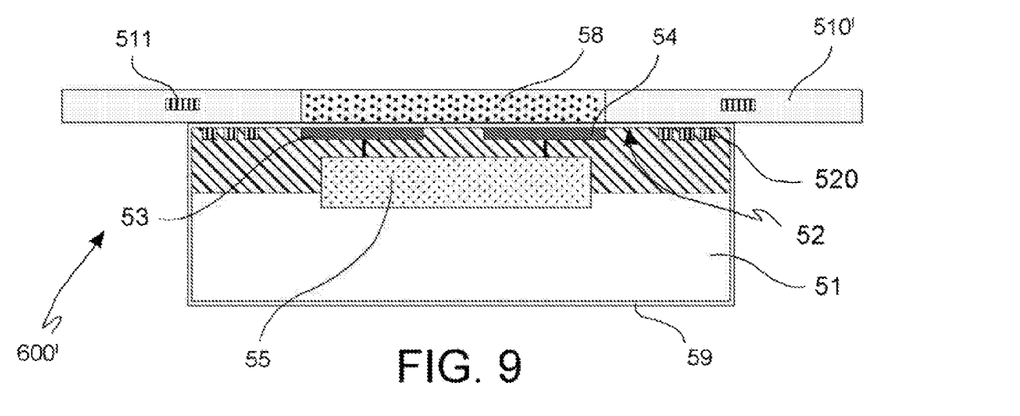

With reference to the embodiments in FIGS. 8-9, the detecting element 58 of the devices 600, 600' is a conductive element which is at least partially distributed within the layer of dielectric material 510'. In greater detail, as shown in the enlarged views of FIGS. 12A-12B, this detecting element 58 comprises a plurality of metallic micro-particles 601, for example of aluminum, which are distributed within the dielectric material layer 510'. Following the application of an electric voltage signal to the first conductive element 53, the micro-particles 601 can be assimilated to, by effect of electric/electromagnetic induction, electric dipoles. Particularly, each particle can be assimilated to an electrode of one or more capacitors formed with the adjacent particles. These particles 601 co-operate to form a pseudo-capacitive plate 602.

Figure 12A:
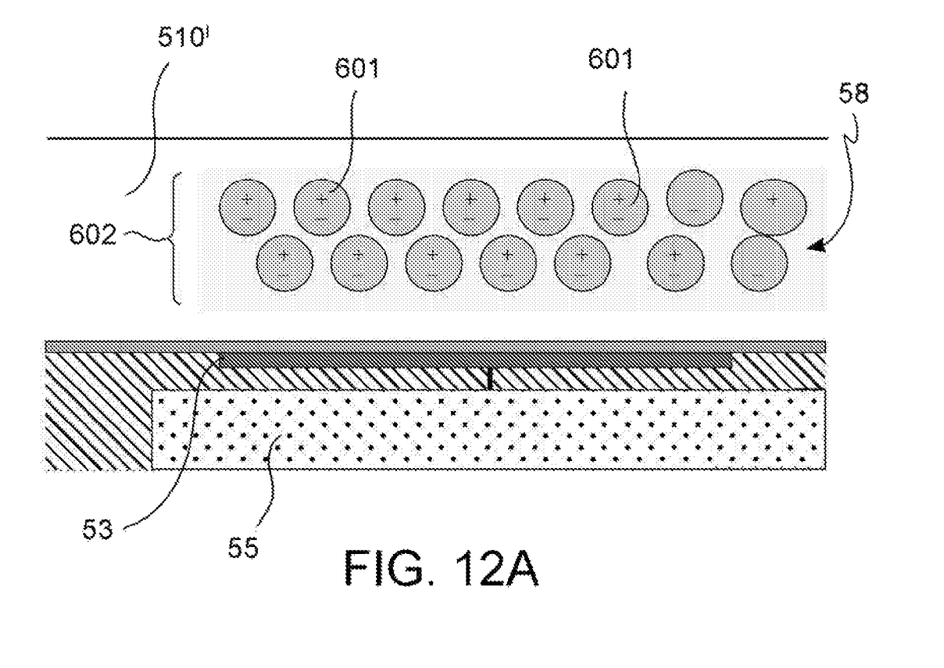
FIGS. 12A, 12B are cross-sectional and enlarged views of a portion of the device in FIG. 8 in two operating conditions.
Figure 12B:
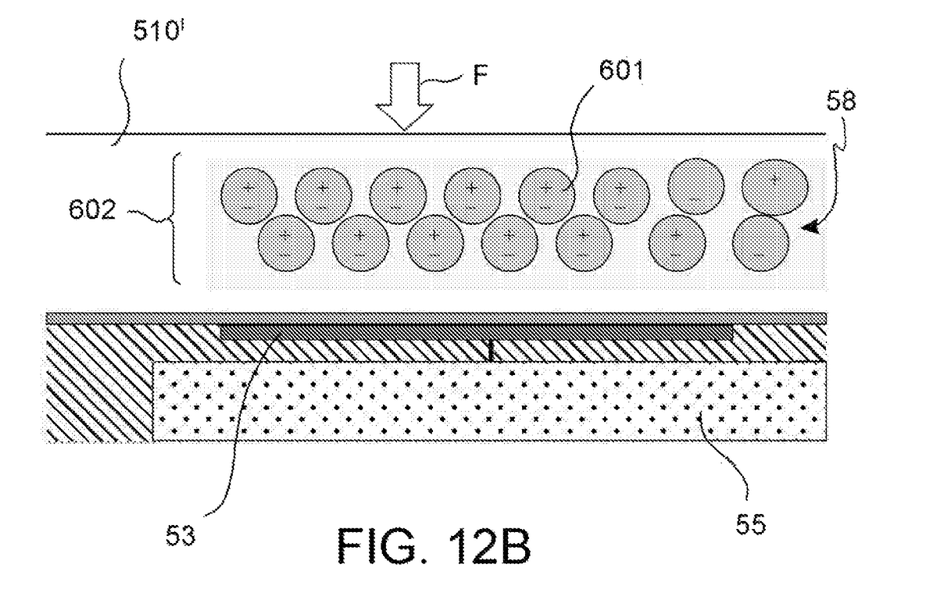

Following the application of a force F in a direction substantially orthogonal to the support layer 510', a reduction has been calculated in the mutual distance between the particles 601 which results in a variation in the contribution to the total resulting capacity between this pseudo-capacitive plate 602 and the first conductive element 53 (and consequently also between the pseudo-capacitive plate 602 and the second conductive element 54).

Figure 10:
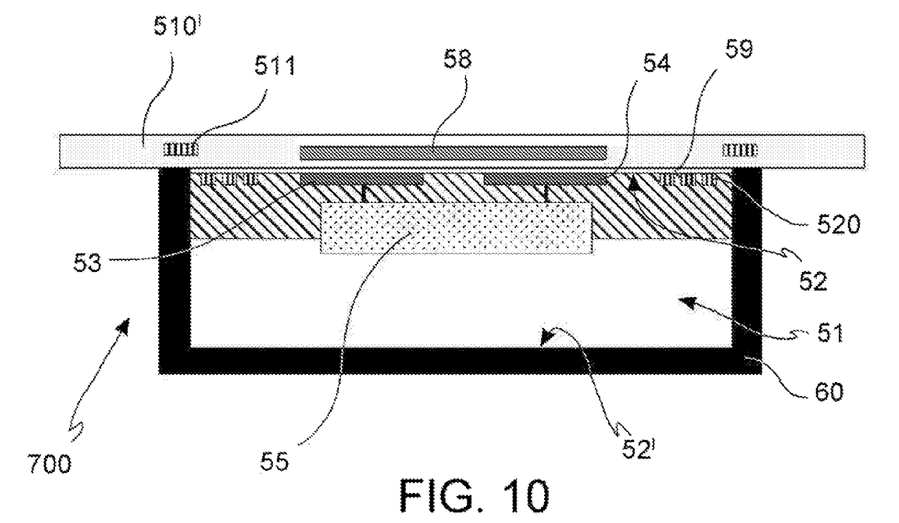
FIGS. 10, 11 are cross-sectional views which relate to further embodiments of the device according to the invention.
Figure 11:
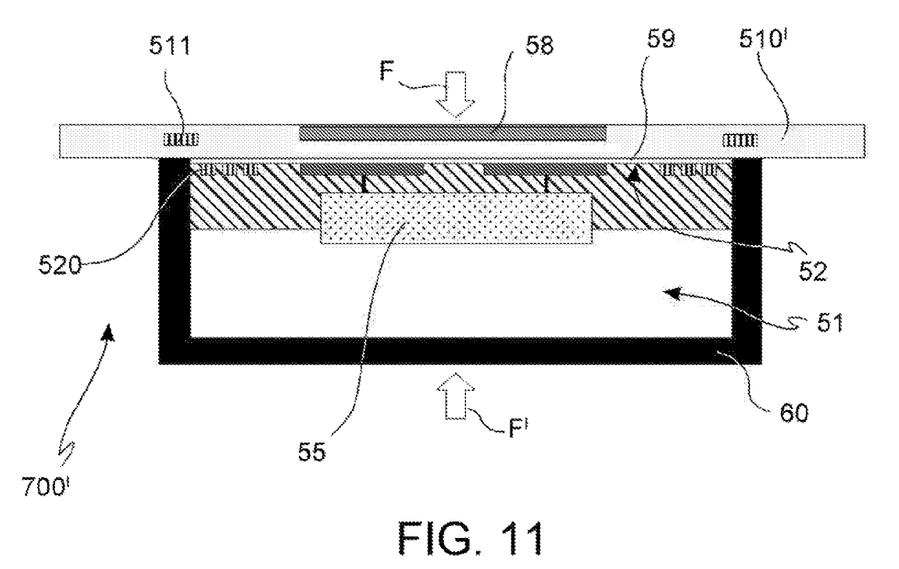

In another embodiment, with reference to the detection devices of FIGS. 10 and 11, these devices 700, 700' comprise a package 60 which is suitable to cover those portions of the integrated element 51 that are not covered by the passivating layer 59. Particularly, this package 60, which is made using a moulding compound, is suitable to protect the detecting device from mechanical stresses F'. In a preferred embodiment, to better transfer the force acting on the inventive device only to the capacitive sensor, i.e. such that the contribution of the force F being detected is predominant, the Young module of the moulding compound is advantageously selected to be much higher than the one of the support layer made of a dielectric material 510'. In an alternative embodiment, a first surface 52' of the integrated element 51 opposite to the operating surface 52 could be deprived of the above-mentioned package 60.

It should be observed that in the detection devices 400, 400a, 500, 500', 600, 600', 700, 700' of the invention, the layer of dielectric material 510, 510' is configured to at least partially include the detecting element 58. Particularly, in the example in FIG. 9, the layer of conductive microparticles 601 can be substantially extended throughout the thickness of the layer of dielectric material 510'. However, with reference to the example in FIG. 11, the detecting element 58 can project from a surface of the layer of dielectric material 510' opposite the surface adjacent the passivation layer 59.

Figure 14:
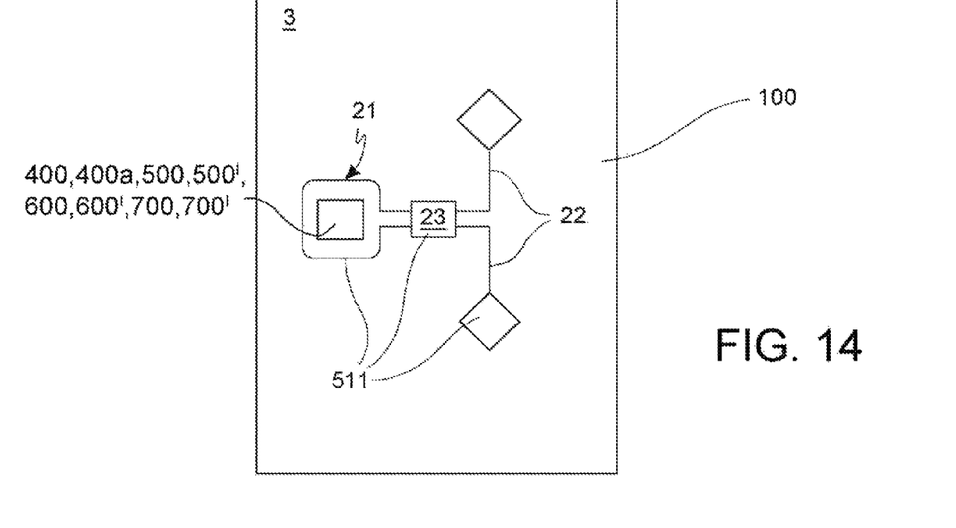
FIG. 14 is a schematic structural diagram illustrating a detecting and monitoring module of the invention.

With reference to FIG. 14, a detection and monitoring module 100 will be now described, which is also included in the invention. This module 400a comprises a detecting device 400, 400a, 500, 500', 600, 600', 700, 700' according to any of the embodiments described above, and further comprises an electromagnetic appliance 511 for the transmission/reception of signals for telecommunications and energy exchange between the embedded antenna 520 of the detecting device and a remote antenna 221 (shown in FIG. 15). These electromagnetic appliances 511 are integral with the detecting device. The embedded antenna 520, the electromagnetic appliances 511 and the remote antenna (221) are operatively associated with each other through magnetic or electromagnetic coupling in wireless mode.

The electromagnetic appliances 511 meet the requirement of allowing a communication between the detecting device, for example the device 500, and an external control and data collection system, which is remotely located, for example at a distance of a few centimeters or meters from the structure to be monitored and thus from the device 500. This implies the requirement of transmitting electromagnetic energy either in the far or near fields, also in view of the attenuations due to the solid structure that the electromagnetic fields must pass through.

Due to these reasons, the embedded antenna 520 in the detecting device 500 is not capable to ensure a remote communication per se, because of inherent limitations mainly resulting from the small size thereof. The electromagnetic appliances 511 have a function of electromagnetic expansion and focalization, i.e. of focusing an external electromagnetic field, and the energy thereof, to the embedded antenna 520 of the detecting device 500; and, similarly, of expanding an electromagnetic field associated with the embedded antenna 520, and the energy thereof, to the remote antenna 221.

In a preferred embodiment, the electromagnetic appliances 511 comprise at least two antennas, a first antenna 21 and a second antenna 22, which are connected to each other by a connecting means or circuit 23. The connecting circuit 23 can be, for example, a transmission line or other circuit.

The first antenna 21 communicates with the embedded antenna 520, via electromagnetic fields, and preferably by coupling the magnetic field (i.e. magnetic coupling in the near field). The second antenna 22 communicates with the remote antenna, for example the antenna 221 of the external control and data collection system, by coupling electromagnetic fields (i.e. electromagnetic coupling in the far field). Each of the first and second antennas 21, 22 can be a magnetic dipole or a Hertzian dipole or also another type of known antenna, as long as it is capable of carrying out the functions described above.

In the embodiment illustrated in FIG. 14, the first antenna 21 of the electromagnetic appliances 511 comprises a coil 21 (also shown in FIG. 7). The connecting circuit 23 of the electromagnetic appliance 511 comprises an adapting circuit 23 (matching network), known per se. The second antenna 22 of the electromagnetic appliance 511 comprises a Hertzian dipole antenna 22.

The coil 21 is positioned near the detecting device 500 and develops thereabout, in such a way as to be magnetically coupled with the embedded antenna 520. The currents induced by the embedded antenna 520 on the coil 21, which acts as the magnetic dipole, are transferred to the Hertzian dipole antenna 22. This transfer is preferably mediated by the adapting circuit 23, which allows improving the overall performance of the electromagnetic means 511.

The monitoring module 100 further comprises a support 3, for example made of polymeric material, on which the detecting device 500 and the electromagnetic appliances 511 are positioned, for example by glueing. This support 3 has the main function of keeping the integrated detection module 500 and the electromagnetic appliances 511 integral to each other, and further of keeping the monitoring module 100 in a predetermined position within the structure to be monitored, as will be illustrated below.

Figure 15:
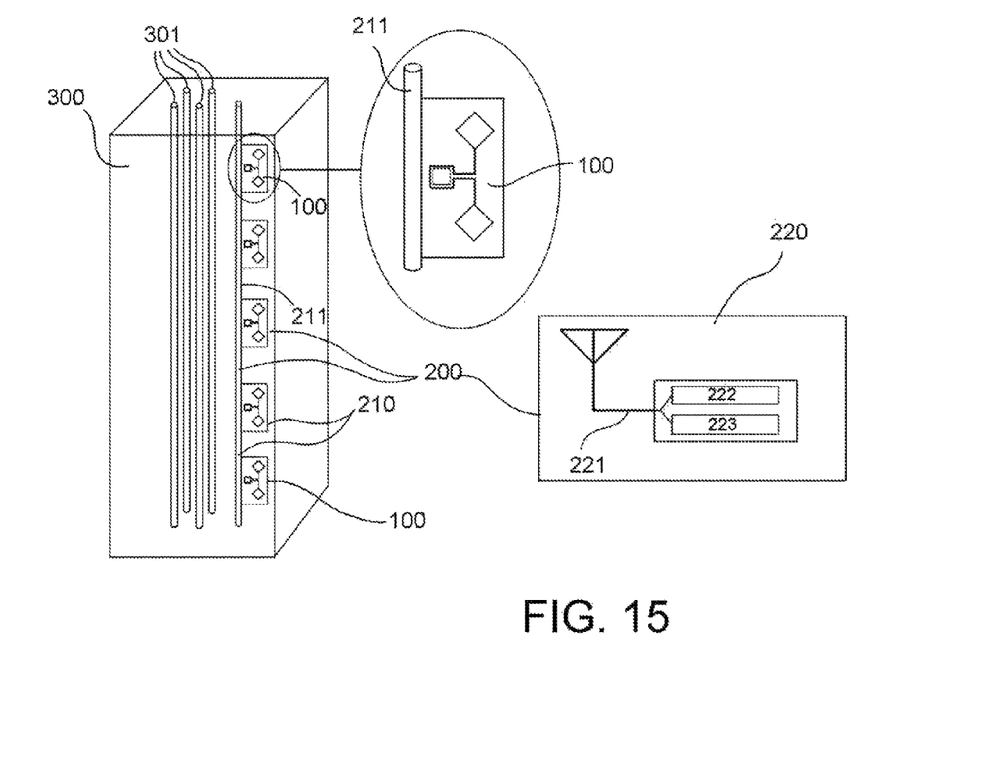
FIG. 15 is a schematic diagram illustrating a monitoring system according to an example of the invention.

According to a variant embodiment, illustrated in FIG. 15, a support strip of polymeric material is provided, such as to be fixed to a support structure 211, and suitable to accommodate, at predetermined distances and positions, a plurality of monitoring modules 100. With reference to FIG. 15, a system 200 for monitoring force and/or pressure in a plurality of points within a solid structure 300 will be now described. This system 200 comprises a monitoring unit 210 placed within the solid structure 300; and a control and data collection unit 220 placed outside of and remote from the solid structure 300.

The internal monitoring sub-system 210 comprises a support structure 211 passing through the points to be monitored within the solid structure 300, and further comprises a plurality of monitoring modules 100 described with reference to FIG. 14. Each of this plurality of monitoring modules 100 is fixed to the support structure 211 in a predetermined position.

The external control and data collection unit 220 comprises the above-mentioned external antenna 221, which is capable of communicating electromagnetically with the electromagnetic appliances 511 of the monitoring modules 100. This unit 220 further includes circuitry for collecting, storing and processing data 222, suitable to receive, store and process data from a plurality of monitoring modules 100 representative of pressure values to be monitored. The unit 220 also comprises power supply and remote power supply units 223, which are suitable to supply energy to the external control and data collection unit 220 and remote power supply to the monitoring unit 210 within the structure 300, via the antenna 221.

In the example of FIG. 15, the structure to be monitored is a reinforced concrete pillar 300, comprising steel reinforcement rods 301, which can also be used as a support structure 211. In an embodiment (not shown), the external antenna 221 and the second antenna 22 can be absent and at least one monitoring module 100 can be connected via a cable to the external control and data collection unit 220.

With reference to FIG. 16-21, a test apparatus is described below in several embodiments, which is configured to test the detecting device 400-700' of the present invention. This test apparatus is designated with numerals 800, 802, 803, 806 and similar or equal elements are designated with the same numerals throughout the figures below.

Figure 16:
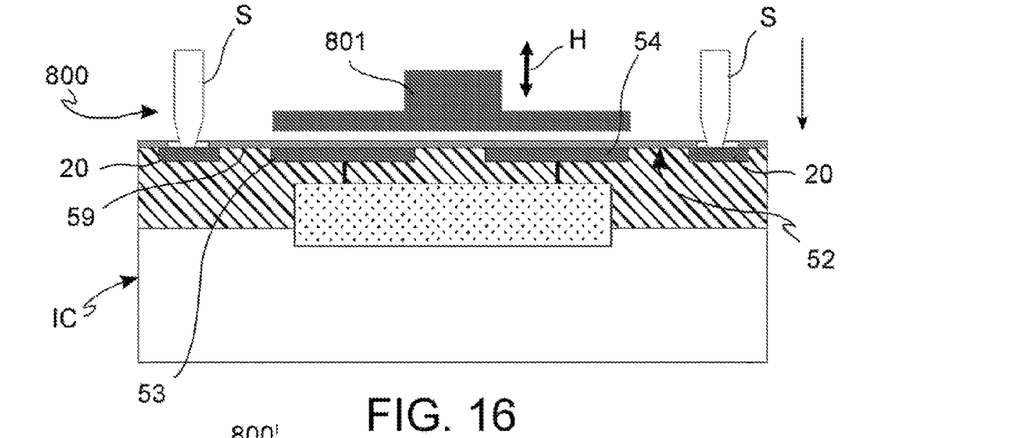
FIGS. 16-21 are schematic diagrams illustrating embodiments of a test apparatus which can be used to test the detecting device of the invention.

With reference to FIG. 16, the integrated electronic device IC which will form the detecting device of the invention, e.g., the device 400, is tested in the form of a wafer using a test apparatus 800 comprising test probes S that are electrically connected to the circuit IC by means of contact pads 20 and a test electrode 801, made of conductive material. This test electrode 801 can be mechanically actuated to translate in a direction substantially orthogonal to the operating surface 52, i.e. above the conductive elements 53, 54 that are integrated within the circuit IC to test the capacitive sensor. The direction and versus of these translations are schematically designated by the bidirectional arrow H.

In an embodiment (not illustrated) a layer of elastically deformed dielectric material is provided between the test electrode 801 and the passivation layer 59 of the circuit IC to avoid damaging the surface of the integrated circuit IC in case the electrode 801 gets in contact therewith.

Figure 17:
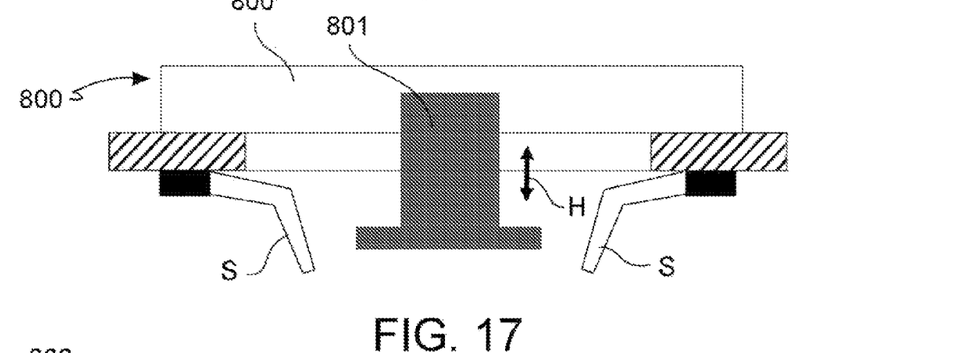

With reference to FIG. 17, the test electrode 801 is moved in the direction and versus as designated by the arrow H via a respective actuating apparatus 800' which is located, for example, above a traditional probe card of a test apparatus. This test electrode 801 can be moved, for example, with a piezo-electrical or electromechanical actuator. In the case of a piezo-electrical actuator, a piezo-electrical element will bend thereby allowing the test electrode 801 to move. In the case of an electromagnetic actuator, a coil attracts or rejects a respective magnetic element integral with the test electrode 801 to move the latter. Several other mechanical element can be present, such as: springs, pins, flexible rods, mechanical guides.

Figure 18:
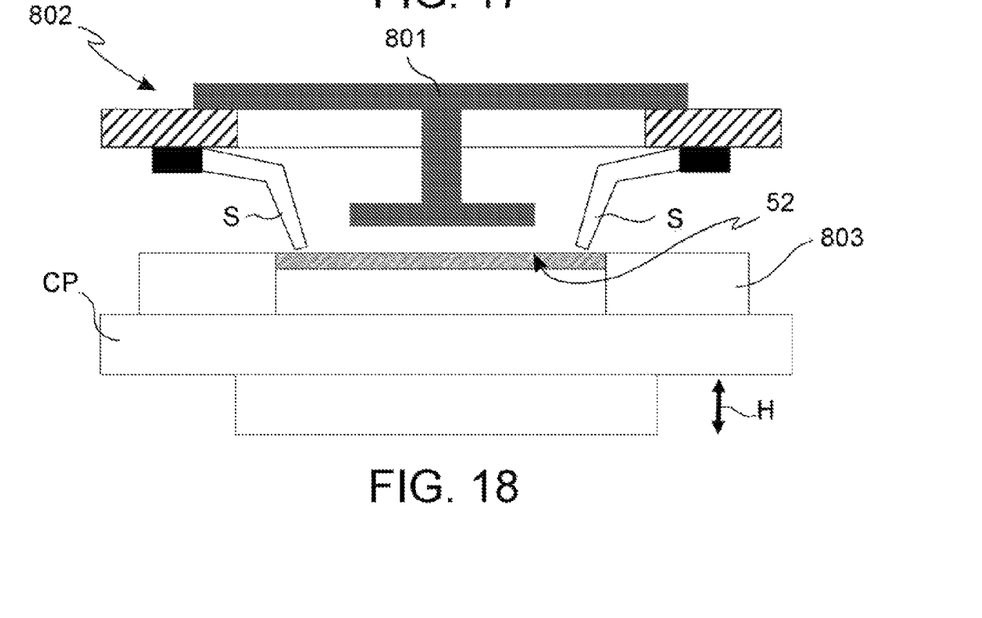

In an alternative embodiment, as shown in FIG. 18, the test apparatus 802 comprises a test electrode 801 which is kept fixed, for example fixed on the probe card, as the support device CP (chuck prober) of the wafer 803 of the circuit IC is moved in the direction and versus as designated by the bidirectional arrow H. Generally, the test electrode 801 and the integrated electronic device IC are mutually movable in the predetermined direction H orthogonal to the operating surface 52 to the device to change the distance between the electrode 801 and this operating surface 52.

Figure 19:
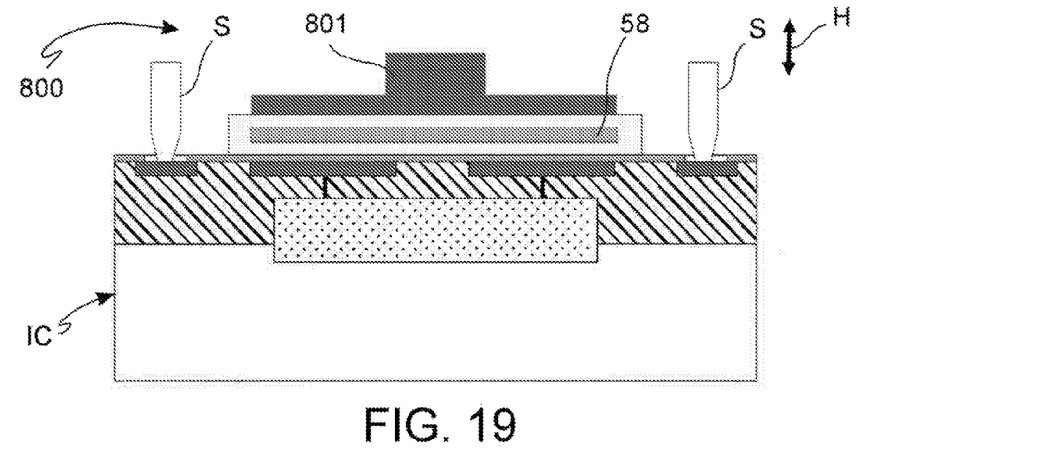

With reference to the embodiment in FIG. 19, in case the integrated circuit IC to be tested also comprises the detecting element 58, the test apparatus 800 can be used in which the movable test electrode 801 operates in an equivalent manner as described above, i.e. this electrode 801 can be mechanically actuated to be moved in the direction of the arrow H above the detecting element 58 to perform the capacitive sensor test. Alternatively, the test electrode 801 can remain fixed and the wafer support device (chuck prober) of the circuit IC is moved in the same direction and versus as the bidirectional arrow H.

Figure 20:
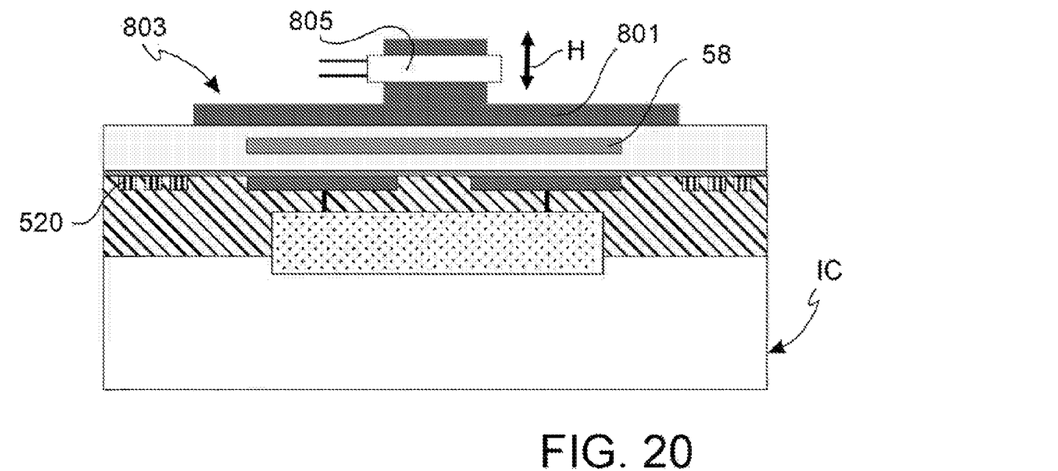

With reference to FIG. 20, in case the integrated circuit IC to be tested comprises both the detecting element 58 and the embedded antenna 520, the circuit IC in the form of a wafer can be tested in a contactless mode with a test apparatus 803 which is not provided with probes S, but which comprises the translatable test electrode 801. The movable electrode 801 either has, for example, magnetic properties or is coated by a magnetic coating. Particularly, the test electrode 801 is operatively associated with a coil 805 to provide energy to the integrated circuit IC and/or communicate therewith during the movement in the direction H. Also in this case, in an alternative embodiment the test electrode 801 can remain fixed and the wafer support device (chuck prober) of the integrated circuit IC is moved in the direction of the arrow H.

Figure 21:
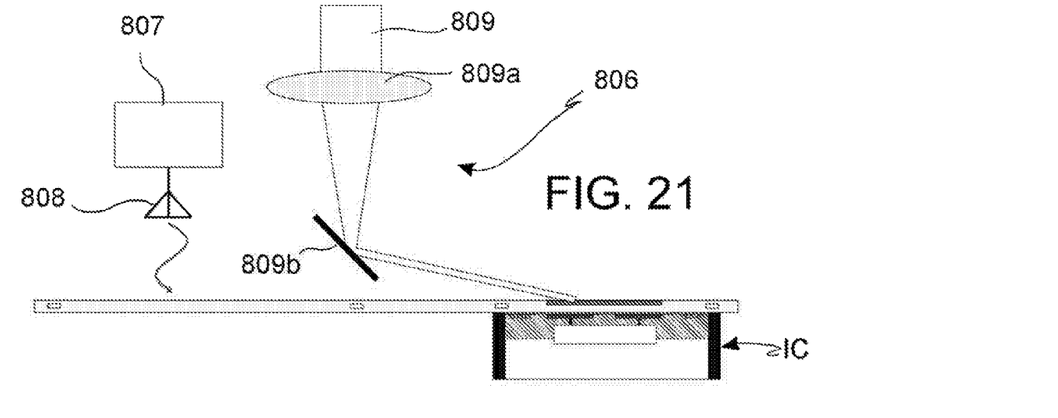

With reference to the embodiment in FIG. 21, the test apparatus 806 is configured to perform the test on the integrated circuit IC in the contactless mode using an Automatic Test Equipment (ATE) or module 807 connected to a respective antenna 808, for example of the hertzian or magnetic type. This test apparatus 806 can provide for the use of a laser 809, an optical system, for example a lens 809a and a mirror 809b to perform a fine tuning (or trimming) operation, known to those skilled in the art, on the capacity of the capacitor C1 and/or C2. This operation, for example, can provide cutting metal portions which form a plate of this capacitor, for example the detecting element 58.

In a further embodiment the test apparatus 806 can perform the contactless test also on the electromagnetic 511 expansion only using the module ATE 807 (Automatic Test Equipment) connected to the antenna 808. To this purpose, instead of the integrated circuit IC a purely passive circuit can be employed, for example a circuit LC to be able to measure the system resonance frequency to perform a fine tuning. This circuit LC can contain an inductor equivalent to the embedded antenna 520 the terminations of which are connected to two capacitive plates similar to the conductive elements 53, 54. Alternatively, it is possible to perform the test and the fine tuning of the capacitor only, e.g. by using a purely passive circuit consisting of two capacitive armatures similar to the conductive elements 53, 54 connected to the module ATE 807.

As can be seen, the object of the present invention is achieved by the detecting device 400, 400a, 500, 500', 600, 600', 700, 700' (as well as the monitoring module and monitoring system according to the invention), due to the features thereof. In fact, the detecting device of the present invention allows for the accurate detection of the force and/or pressure and/or mechanical stress that is present in a point to be monitored within a solid structure 300. Furthermore, advantageously, the constructive features of the above-mentioned detecting device make it substantially insensitive to the corrosion effects which are present within the solid structure 300.

The monitoring module and system according to the invention are based on the device according to the invention, and benefit therefrom. Furthermore, the system described herein can be used to measure the fluid pressure, for example within tanks or chemical plants, or the pressure of the building material before it hardens and forms the solid structure 300.

To the embodiments of the detecting device, and of the module and of the monitoring system described above, those skilled in the art, to meet contingent requirements, may carry out modifications, adaptations, and replacements of elements with others functionally equivalent also in conjunction with the prior art, also by creating hybrid implementations, without departing from the scope of the following claims. Each of the characteristics described as belonging to a possible embodiment can be carried out independently from the other embodiments described herein.

The invention claimed is:

1. An integrated electronic device comprising:
   an integrated element having an operating surface substantially orthogonal to a direction of application of an external force;
   first and second conductive elements within the integrated element and configured to face the operating surface;
   a measuring module within the integrated element and comprising first and second measurement terminals which are electrically coupled to the first and second conductive elements, respectively;
   a detecting element arranged in the direction such that the operating surface is sandwiched between the first and second conductive elements and the detecting element, wherein the detecting element is configured to move in the direction of the external force in response to the application of the external force; and
   a dielectric layer sandwiched between the detecting element and the first and second conductive elements, wherein the detecting element is capacitively coupled to the first and second conductive elements through the dielectric layer, and wherein the dielectric layer is elastically deformable in response to the application of the external force in the direction to change an electromagnetic coupling between the detecting element and the first and second conductive elements, wherein the integrated electronic device is configured to detect the external force applied in the direction.

2. The integrated electronic device according to claim 1, wherein the first and second conductive elements comprise metal elements.

3. The integrated electronic device according to claim 1, wherein the first and second conductive elements comprise interdigitated metal plates.

4. The integrated electronic device according to claim 1, wherein the detecting element comprises a single-piece conductive element.

5. The integrated electronic device according to claim 4, wherein the single-piece conductive element comprises a corrosion-resistant material.

6. The integrated electronic device according to claim 1, wherein the detecting element comprises a conductive element at least partially distributed within the dielectric layer.

7. The integrated electronic device according to claim 1, wherein the dielectric layer includes at least a part of the detecting element.

8. The integrated electronic device according to claim 1, wherein the dielectric layer comprises a material having a Young's modulus lower than 20 GPa.

9. The integrated electronic device according to claim 1, wherein the dielectric layer comprises a polymer or elastomer.

10. The integrated electronic device according to claim 1, wherein the detecting element comprises a plurality of metal microparticles distributed within the dielectric layer.

11. The integrated electronic device according to claim 1, further comprising an electromagnetic appliance adjacent the detecting element and configured to transmit and receive electromagnetic signals and energy between the measuring module and an external system.

12. The integrated electronic device according to claim 1, wherein the first conductive element and the detecting element define plates of a first capacitor, and the second conductive element and the detecting element define plates of a second capacitor, the first and second capacitors being connected in series to each other.

13. The integrated electronic device according to claim 1, wherein the measuring module is configured to generate a voltage at a chosen frequency.

14. The integrated electronic device according to claim 1, further comprising:
   an insulating layer coating at least the operating surface and disposed between the dielectric layer and the first and second conductive elements.

15. The integrated electronic device according to claim 14, further comprising a support layer configured to support the electromagnetic appliance, and arranged in the direction such that the dielectric layer is sandwiched between the insulating layer and the support layer.

16. The integrated electronic device according to claim 15, wherein the support layer comprises a through-cavity therein and positioned relative to the direction and the detecting element.

17. The integrated electronic device according to claim 14, further comprising a support layer configured to support an electromagnetic appliance and comprising an elastically deformable dielectric material, and also supporting the detecting element at least partially adjacent the insulating layer at the operating surface of the integrated element.

18. The integrated electronic device according to claim 17, wherein the support layer includes a first dielectric support layer sandwiched between the detecting element and the insulating layer, and having a dielectric constant greater than a dielectric constant of the dielectric layer.

19. The integrated electronic device according to claim 14, further comprising a package layer coating portions of the device which are not coated by the insulating layer.

20. A pressure monitoring system to monitor a plurality of points within a solid structure, and comprising:
   an internal monitoring unit within the solid structure; and
   a control and data collection unit external of the solid structure;
   the internal monitoring unit comprising
      a support structure passing through the points to be monitored within the solid structure, and
      a plurality of monitoring modules each being fixed to the support structure in a respective position to detect pressure, and each comprising an electronic device to detect the pressure related to a force applied in a direction within the solid structure, and including
         an integrated element having an operating surface substantially orthogonal to the direction of application of the force,
         first and second conductive elements within the integrated element and configured to face the operating surface,
         a measuring module within the integrated element and comprising first and second measurement terminals which are electrically coupled to the first and second conductive elements, respectively, a detecting element arranged in the direction such that the operating surface is sandwiched between the first and second conductive elements and the detecting element, an insulating layer coating at least the operating surface to insulate the first and second conductive elements from the detecting element, a dielectric layer sandwiched between the detecting element and the insulating layer, and being elastically deformable in response to the application of the force in the direction to change an electromagnetic coupling between the detecting element and the first and second conductive elements, and an electromagnetic appliance configured to transmit and receive electromagnetic signals and energy from the measuring module, and including a first antenna configured for wireless communication;

the control and data collection unit comprising a second antenna;

a processing unit configured to collect, store and process data, and to wirelessly receive data from the plurality of monitoring modules via the first and second antennas, and a power supply configured to supply power to the control and data collection unit, and supply remote power to the internal monitoring unit via the second antenna.

21. The pressure monitoring system according to claim 20, wherein, in the electronic device, the first conductive element and the detecting element define plates of a first capacitor, and the second conductive element and the detecting element define plates of a second capacitor, the first and second capacitors being connected in series to each other.

22. A method of forming a pressure sensor, and comprising:

placing an integrated element having an operating surface substantially orthogonal to a direction of application of an external force;

providing first and second conductive elements within the integrated element and configured to face the operating surface;

providing a measuring module within the integrated element and comprising first and second measurement terminals which are electrically coupled to the first and second conductive elements, respectively;

arranging a detecting element in the direction such that the operating surface is sandwiched between the first and second conductive elements and the detecting element, wherein the detecting element is configured to move in the direction of the external force in response to the application of the external force;

coating at least the operating surface with an insulating layer to insulate the first and second conductive elements from the detecting element;

sandwiching a dielectric layer between the detecting element and the insulating layer, wherein the detecting element is capacitively coupled to the first and second conductive elements through the dielectric layer, wherein the dielectric layer is elastically deformable in response to the application of the external force in the direction to change an electromagnetic coupling between the detecting element and the first and second conductive elements, wherein the pressure sensor is configured to detect the pressure related to the external force applied in the direction within a solid structure.

23. The method according to claim 22, wherein the first and second conductive elements comprise interdigitated metal plates.

24. The method according to claim 22, wherein the detecting element comprises a conductive element at least partially distributed within the dielectric layer.

25. The method according to claim 22, wherein the dielectric layer comprises a polymer or elastomer.

26. The method according to claim 22, further comprising providing an electromagnetic appliance adjacent the detecting element and configured to transmit and receive electromagnetic signals and energy between the measuring module and an external system.

27. The method according to claim 22, wherein the first conductive element and the detecting element define plates of a first capacitor, and the second conductive element and the detecting element define plates of a second capacitor, the first and second capacitors being connected in series to each other.

28. A sensor comprising:

a metallization layer disposed over a substrate, the metallization layer comprising a first capacitive plate and a second capacitive plate;

a dielectric layer disposed over the metallization layer, the dielectric layer being elastically deformable and comprising an elastic modulus less than the substrate and the metallization layer; and a moveable capacitor plate disposed over the dielectric layer, wherein the moveable capacitor plate is capacitively coupled to the first capacitive plate to form a first sense capacitor and is capacitively coupled to the second capacitive plate to form a second sense capacitor, wherein the first sense capacitor and the second sense capacitor are configured to measure a change in capacitance in response to a change in thickness of the dielectric layer, which is in response to a force applied to the moveable capacitor plate.

29. The sensor of claim 28, wherein the dielectric layer comprises a polymer or a elastomer.

30. The sensor of claim 28, wherein the moveable capacitor plate comprises metal microparticles embedded in a dielectric material.

31. The sensor of claim 28, wherein the substrate comprises a major surface, wherein the moveable capacitor plate is parallel to the major surface, wherein a foot print of the moveable capacitor plate on the major surface of the substrate is less than a foot print of the dielectric layer on the major surface of the substrate.

32. The sensor of claim 28, further comprising:

functional circuitry disposed in the substrate; and a first antenna embedded in the metallization layer, the first antenna electrically coupled to the functional circuitry in the substrate.

33. The sensor of claim 32, further comprising:

a support layer disposed over the dielectric layer; and a second antenna disposed in the support layer, the second antenna electromagnetically coupled with the first antenna in the metallization layer.

34. The sensor of claim 33, wherein the second antenna is configured to transmit and receive electromagnetic signals and energy.

35. The sensor of claim 28, wherein the moveable capacitor plate is a floating electrode and not directly electrically coupled to any other electrical component in the sensor.

36. The sensor of claim 28, wherein the first sense capacitor, the second sense capacitor are part of a first sensor package embedded at a first location in a solid structure, the sensor further comprising further sense capacitors comprising fixed capacitor electrodes, a elastically deformable capacitor dielectric layer, and a moveable capacitor electrode embedded at a second location in the solid structure.

37. The sensor of claim 28, wherein the dielectric layer and the substrate have a substantially similar density.

* * * * *